United States Patent
Wang (10) Patent No.: US 7,333,673 B2
(45) Date of Patent: Feb. 19, 2008

(54) METHOD AND APPARATUS FOR IMAGE DETAIL ENHANCEMENT WITHOUT ZIGZAGGED EDGE ARTIFACT

(75) Inventor: Xianglin Wang, Santa Ana, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 690 days.

(21) Appl. No.: 10/697,132

(22) Filed: Oct. 30, 2003

(65) Prior Publication Data

US 2005/0094890 A1      May 5, 2005

(51) Int. Cl.
*G06K 9/40* (2006.01)
*G06K 9/48* (2006.01)
*G09G 5/00* (2006.01)

(52) U.S. Cl. ............ 382/269; 382/199; 382/254; 382/260; 382/264; 382/266; 345/611

(58) Field of Classification Search ............ 382/209, 382/263, 266, 269, 275, 199
See application file for complete search history.

(56) References Cited

U.S. PATENT DOCUMENTS

| | | | | |
|---|---|---|---|---|
| 4,853,970 A | * | 8/1989 | Ott et al. | 382/266 |
| 5,050,227 A | * | 9/1991 | Furusawa et al. | 382/269 |
| 5,471,987 A | * | 12/1995 | Nakazawa et al. | 600/436 |
| 5,712,682 A | * | 1/1998 | Hannah | 348/255 |
| 6,252,995 B1 | * | 6/2001 | Takamori | 382/254 |
| 6,285,798 B1 | * | 9/2001 | Lee | 382/260 |
| 6,611,627 B1 | * | 8/2003 | LaRossa et al. | 382/240 |
| 6,628,842 B1 | * | 9/2003 | Nagao | 382/266 |
| 6,982,723 B1 | * | 1/2006 | Szymaniak | 345/611 |
| 7,130,483 B2 | * | 10/2006 | Kim | 382/266 |
| 2004/0189874 A1 | | 9/2004 | Wang et al. | 348/627 |
| 2005/0094877 A1 | | 5/2005 | Wang et al. | 382/199 |

FOREIGN PATENT DOCUMENTS

EP      920190 A2 *   6/1999
WO   WO 9007751 A1 *  7/1990

OTHER PUBLICATIONS

Hardie R.C., Boncelet C.G., Gradient-Based edge Detection Using Nonlinear Edge Enhancing Prefilters, IEEE Transactions on Image Processing, vol. 4, No. 11, Nov. 1995, pp. 1572-1577.*

* cited by examiner

*Primary Examiner*—Samir Ahmed
*Assistant Examiner*—José M Torres
(74) *Attorney, Agent, or Firm*—Kenneth L. Sherman, Esq.; Michael Zarrabian, Esq.; Myers Dawes Andras & Sherman, LLP (57) ABSTRACT

A method and system for detecting slant edge areas in an image comprising a plurality of pixels, and for preventing zigzagged slant edge artifacts in an image detail enhancement process. Image pixels that belong to a slant image edge are detected and gain suppression factors are determined for the detected pixels. The image is detail enhanced while selectively reducing enhancement of the detected image pixels relative to enhancement of other image pixels based on the gain suppression factors.

26 Claims, 7 Drawing Sheets

METHOD AND APPARATUS FOR IMAGE DETAIL ENHANCEMENT WITHOUT ZIGZAGGED EDGE ARTIFACT

FIELD OF THE INVENTION

The present invention relates to image detail enhancement, and in particular, to image detail enhancement to improve the sharpness of an image.

BACKGROUND OF THE INVENTION

Image detail enhancement is frequently used in digital video systems such as digital television sets. A goal of image detail enhancement is to improve the image sharpness. As such, image high frequency components that contain image details are extracted, enhanced and added back to the original image so that the details in the processed image become more obvious to a viewer.

Figure 1:
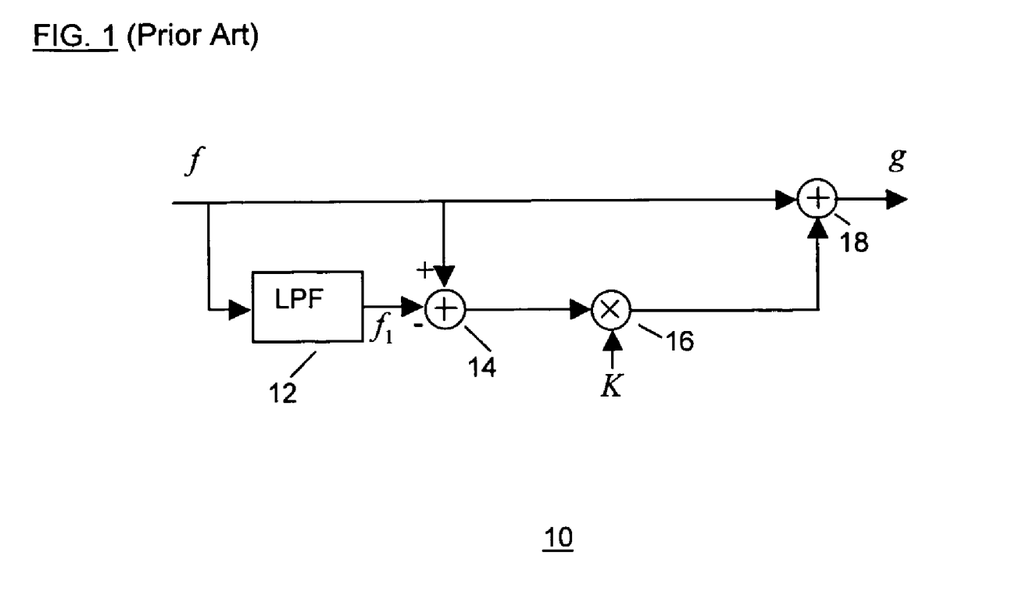
FIG. 1 shows a block diagram of a conventional detail enhancement system.

FIG. 1 shows a block diagram of a conventional image detail enhancement system 10, also known as unsharp masking. An original image f is passed through a low pass filter (LPF) 12 to obtain an image $f_1$ (unsharp signal), wherein the image $f_1$ is subtracted from the original image f in a node 14, to obtain the difference $(f-f_1)$. The difference $(f-f_1)$ is then boosted by a factor of K (K>0) in a multiplier 16, before being added back to the original image f in a node 18, to generate an enhanced output image g. The relationship between the output signal g and the input signal f can be expressed as:

$$g=(f-f_1)*K+f \quad (1)$$

The low pass filter 12 can be either a one dimensional (1D) filter or a two dimensional (2D) filter. If it is a 1D filter, the detail enhancement process can be performed along the horizontal and vertical directions separately.

Generally, an image edge can be enhanced in detail enhancement processes because an image edge is usually associated with high frequency image components. However, using a system shown in FIG. 1, some artifacts can also be introduced into the edge area.

Figure 2A:
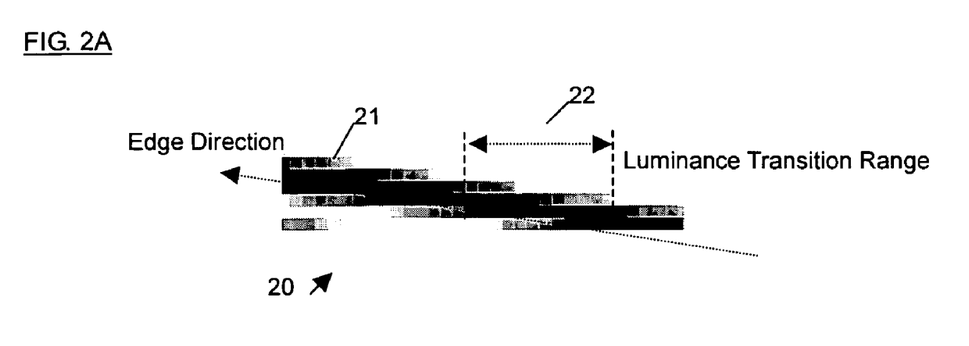
FIG. 2A shows an example smooth-looking slant image edge before detail enhancement.

An instance of such visual artifacts is a zigzagged edge due to conventional image detail enhancement. An example of the zigzagged edge artifact is described in conjunction with FIGS. 2A-B. FIG. 2A shows an original image edge 20, wherein each small square block 21 in the edge 20 represents one image pixel. The edge direction has a low angle relative to the horizontal direction. Along the horizontal direction across the edge, there is a long luminance transition range 22 from dark area to bright area or vice versa, as indicated in FIG. 2A. The luminance transition range 22 refers to the length of the luminance transitioning area of an edge either along the horizontal direction or along the vertical direction across the edge. With such a luminance transitioning area around the edge, the boundary of the edge shown in FIG. 2A looks generally smooth even though the edge has a limited image resolution.

Figure 2B:
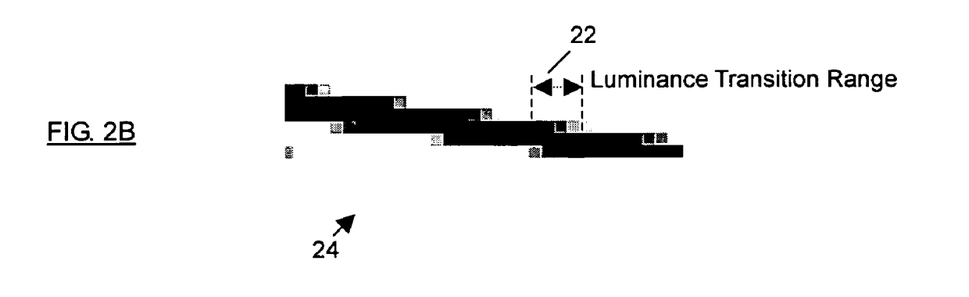
FIG. 2B shows the same edge in FIG. 2A after detail enhancement, wherein the edge becomes zigzagged due to over enhancement.

A conventional image detail enhancement process is applied to the image edge 20 of FIG. 2A to generate the enhanced image 24 in FIG. 2B. Because in an image detail enhancement process high frequency components are boosted, the luminance transition range 22 may become shorter (or sharper). As can be seen in FIG. 2B, the luminance transition range 22 along the horizontal direction has become much shorter relative to that in FIG. 2A. As a consequence, the edge boundary now looks zigzagged. The more the image is enhanced in the detail enhancement process, the more obvious this kind of artifact would be. As a result, even though the image in FIG. 2B is enhanced, the quality of the image looks poor due to the degradation of edge quality.

The problem shown in FIG. 2B exists for most slant image edges. A slant image edge refers to an image edge whose direction is not exactly vertical or horizontal. Only when an image edge has exactly vertical or horizontal direction or precisely ±45° (i.e., +45° or −45°) direction, it is immune to the problem shown in FIG. 2B. Otherwise, a slant image edge can develop zigzagged edge artifacts if it is enhanced substantially.

As such, there is a need for a method of preserving edge quality and preventing zigzagged edge artifacts in detail enhancement, without sacrificing the enhancement of other image details that are not prone to zigzagged edge artifacts when enhanced.

BRIEF SUMMARY OF THE INVENTION

The present invention addresses the above needs. In one embodiment the present invention provides a method for detecting slant edge areas in an image comprising a plurality of pixels, and for preventing zigzagged edge artifacts in an image detail enhancement process. Because zigzagged edge artifact can occur at slant image edge areas due to over-enhancement, the purpose of the slant edge detection is to locate the pixels of slant edges so that the enhancement gain at those pixel locations can be appropriately reduced or suppressed.

In one example slant edge detection process, pixels in a rectangular window of pixels centered with a selected/current pixel are used to detect a slant edge at the current pixel location. The center as well as the luminance transition range of a slant edge is detected.

Once a slant image edge is detected and its luminance transition range is determined, a corresponding gain suppression factor/parameter is calculated and assigned to each pixel within the detected luminance transition range of the slant edge. Using the suppression factor, in a detail enhancement process the enhancement gain for a slant edge pixel is selectively adjusted such that the original length of the luminance transition range is maintained and the zigzagged edge artifacts associated with the enhanced slant edge are reduced.

The adjustment of enhancement gain for pixels within the detected luminance transition range of a slant edge is based on several factors, including a pixel's position within the luminance transition range of a slant edge, the luminance contrast of the edge and the amplitude of the enhancement gain. In one example, these factors are utilized in determining a gain suppression factor that is combined with the enhancement gain (generating an adjusted enhancement gain) so that the enhancement for slant edge pixels is selectively reduced to avoid/reduce introduction of zigzagged edge artifacts during image detail enhancement.

Other objects, features and advantages of the present invention will be apparent from the following specification taken in conjunction with the following drawings.

DETAILED DESCRIPTION OF THE INVENTION

Figure 3:
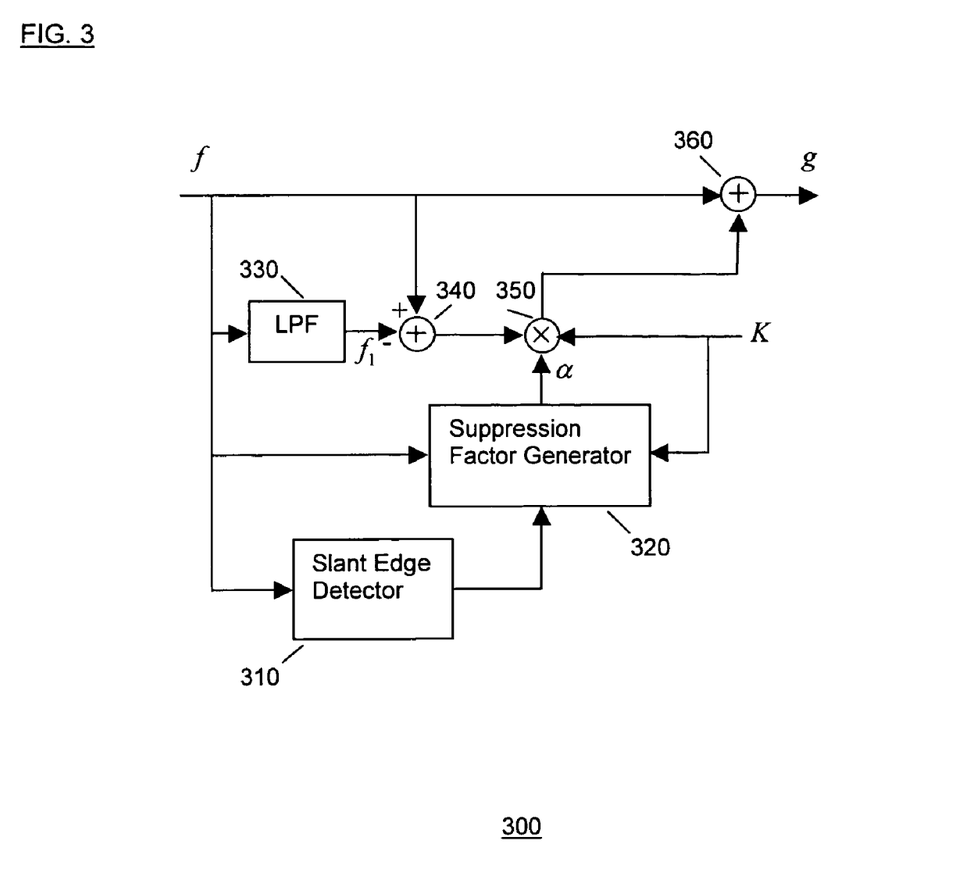
FIG. 3 shows an example functional block diagram of an embodiment of a detail enhancement system according to the present invention.

Referring to the example functional block diagram in FIG. 3, in one embodiment the present invention provides a detail enhancement system 300 that detects slant edge areas in an image comprised of pixels, and prevents zigzagged edge artifacts in image detail enhancement.

The present invention addresses the above needs. In one embodiment the present invention provides a method for detecting slant edge areas in an image comprising a plurality of pixels, and for preventing zigzagged edge artifacts in an image detail enhancement process. Because zigzagged edge artifact can occur at slant image edge areas due to over-enhancement, the purpose of the slant edge detection is to locate the pixels of slant edges so that the enhancement gain at those pixel locations can be appropriately reduced or suppressed.

In one example slant edge detection process, pixels in a rectangular window of pixels centered with a selected/current pixel are used to detect a slant edge at the current pixel location. To do so, first the luminance mean value for the window pixels are determined, and then the value of each pixel inside the window is compared with the luminance mean value. Only the comparison results are used in the succeeding detection process. To facilitate the processing, such comparison results can be saved as binary pattern data for each pixel in the window. Then, by checking the binary pattern data, it is determined if the current pixel is a center pixel in a luminance transition range of a slant edge. If it is, then the exact luminance transition range of the edge is detected based on the binary pattern data.

Once a slant image edge is detected and its luminance transition range is determined, a corresponding gain suppression factor/parameter is calculated and assigned to each pixel within the detected luminance transition range of the slant edge. Using the suppression factor, in a detail enhancement process the enhancement gain for a slant edge pixel is selectively adjusted such that the original length of the luminance transition range is maintained and the zigzagged edge artifacts associated with the enhanced slant edge are reduced.

The adjustment of enhancement gain for pixels within the detected luminance transition range of a slant edge is based on several factors, including a pixel's position within the luminance transition range of a slant edge, the luminance contrast of the edge and the amplitude of the enhancement gain. In one example, these factors are utilized in determining a gain suppression factor that is combined with the enhancement gain (generating an adjusted enhancement gain) so that the enhancement for slant edge pixels is selectively reduced to avoid/reduce introduction of zigzagged edge artifacts during image detail enhancement.

The example system 300 in FIG. 3 includes a slant edge detector (SED) 310, a suppression factor generator (SFG) 320 and a low pass filter (LPF) 330. The SED 310 is used to detect the location and the length of a luminance transition range of a slant edge. Based on the slant edge detection result, as well as an enhancement gain parameter K and the local luminance contrast, the gain suppression factor $\alpha (0 \leq \alpha \leq 1)$ is generated by the SFG 320 for each pixel location within the detected luminance transition range. The suppression factor $\alpha$ is combined with the original enhancement gain parameter K and jointly determine the enhancement intensity at each pixel location.

The system 300 further includes the summation nodes 340, 360 and the multiplication node 350. The LPF 330, and the nodes 340, 350 and 360 in FIG. 3, operate in a similar manner as the LPF 12, and the nodes 14, 16 and 18 in FIG. 1, respectively. In operation of the example system 300 of FIG. 3, the original image f is passed through a low pass filter (LPF) 330 to obtain an image $f_1$ (unsharp signal), wherein the image $f_1$ is subtracted from the original image f in the node 340, to obtain the difference $(f-f_1)$. The difference $(f-f_1)$ is then boosted by a factor of K (K>0) in the multiplier 350 based on a suppression factor $\alpha$ according to the present invention, before being added back to the original image f in the node 360, to generate an enhanced output image g. As such, the relationship between the output signal g and the input signal f in the system 300 can be expressed as:

$$g=(f-f_1)*K*\alpha+f \qquad (2)$$

Conceptually, for slant edge pixels where zigzagged edge artifact is likely to occur in detail enhancement, a relatively small $\alpha$ is generated. For pixels that do not belong to a slant edge, $\alpha$ takes a value of 1, which means that no gain suppression is needed at those pixel locations.

To determine the value of $\alpha$ at a selected pixel location, the SED 310 first detects whether the current pixel belongs to a slant edge area. As such, the SED 310 detects all the slant edge pixels and provides the center location as well as the length of the luminance transition range of the slant edge.

Figure 4A:
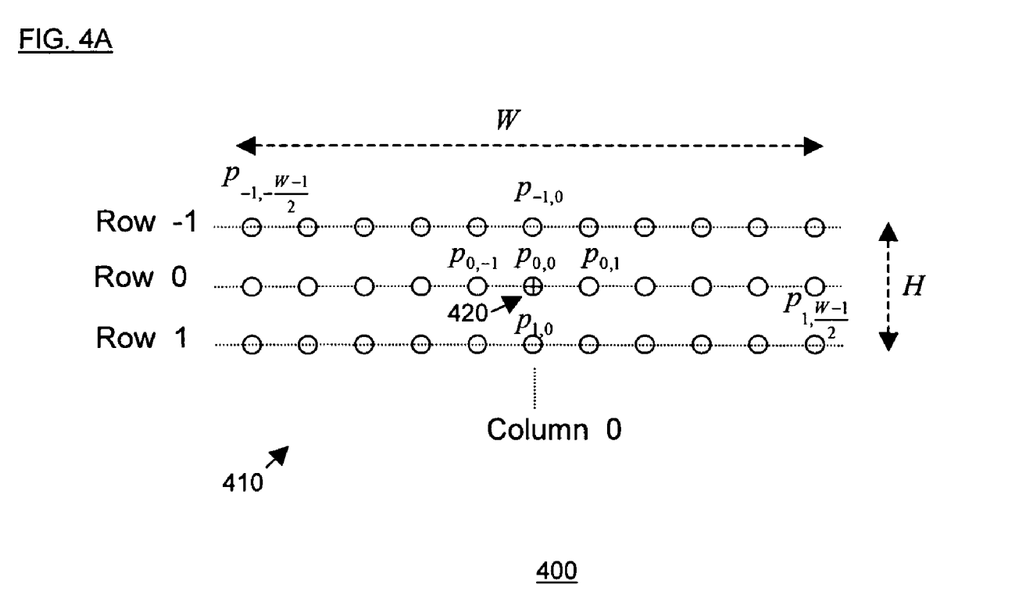
FIG. 4A shows a diagram of pixels inside an example window centered with a current/selected pixel and its neighboring pixels, for the detection of slant image edge at the current pixel location.
Figure 4B:
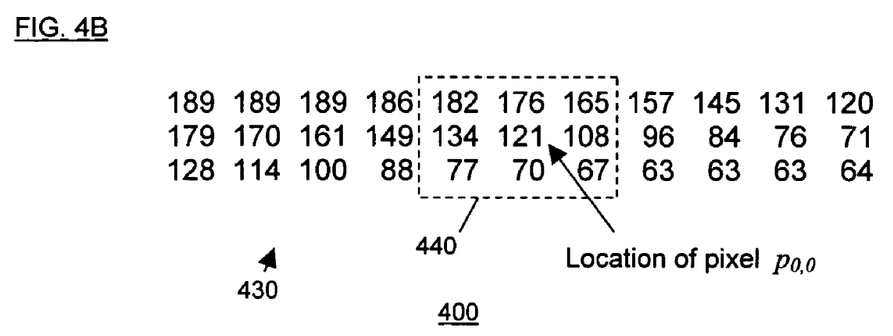
FIG. 4B shows an example of values for pixels in the window shown in FIG. 4A.
Figure 4C:
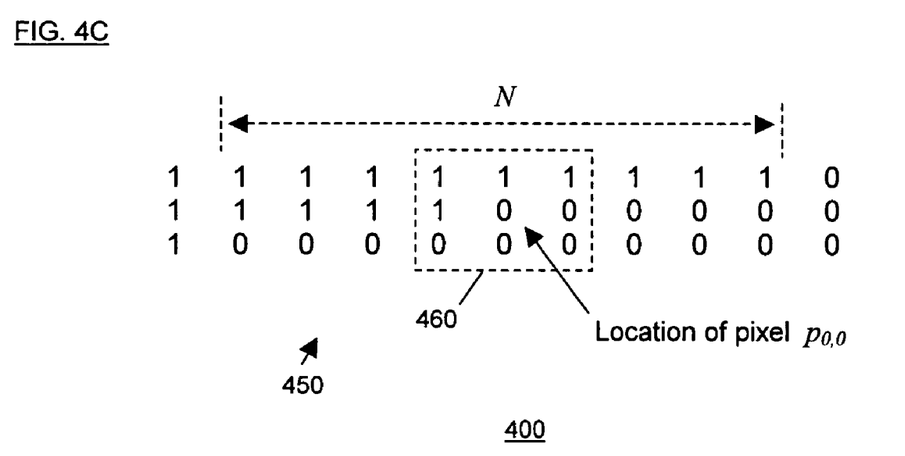
FIG. 4C shows an example binary pattern data corresponding to the pixel values in FIG. 4B, in which a slant edge can be detected, with a luminance transition range of 9 pixels wide.

An example method of slant edge detection is provided in co-pending patent application, entitled: "Method and Apparatus for Detecting the Location and Luminance Transition range of Slant Image Edges," by Xianglin Wang and Yeong-Taeg Kim, U.S. patent application Ser. No. 10/697,361, now U.S. Pat. No. 7,263.229, the disclosure of which is incorporated herein by reference in its entirety. Referring to the example diagram in FIG. 4A, detection of slant image edges is conducted in a rectangular window 400 of pixels 410 centered with a current pixel 420. Further, FIG. 4B shows example values 430 for the pixels 410 in the window 400 of FIG. 4A. The mean value of a plurality of the pixels 410 inside the rectangular window 400 is calculated. Then, the value of each pixel inside the window 400 is compared with the mean value. Only the comparison results are used in the succeeding detection process. To facilitate the processing, such comparison result can be saved as a binary pattern data 450 such as shown in FIG. 4C for each pixel in the window 400. For example, if a pixel 410 in the rectangular window 400 has a value (e.g., luminance) that is not smaller than the mean value, the corresponding binary pattern data for that pixel can be assigned a value of 1. Otherwise, the corresponding binary pattern data for that pixel is assigned a value of 0 (e.g., FIG. 4B and 4C).

The binary pattern data 450 corresponding to the pixels 410 within the rectangular window 400 are checked to determine if the current pixel is a center pixel in a luminance transition range of a slant edge. If it is, the length of the luminance transition range is determined by checking the binary pattern data. In the example shown in FIG. 4C, the binary pattern data 450 corresponding to the window 400 including the current pixel 420, indicate that the current pixel 420 is a center pixel in the luminance transition range of a slant edge. In addition, the length N of the luminance transition range can be determined as 9 pixels wide according to the method provided in co-pending patent application referenced above.

Figure 5A:
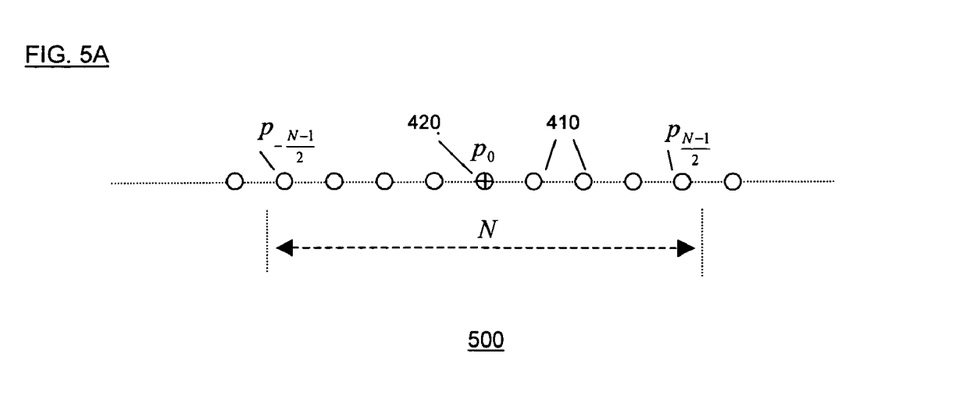
FIG. 5A shows pixels in an example luminance transition range.

Once the SED 310 determines that the current pixel 420 is the center pixel in the luminance transition range of a slant edge and the length of the luminance transition range is detected as N pixels wide (wherein N is an odd number value, N≦W), then enhancement of all the N pixels within the luminance transition range needs to be appropriately suppressed using a suppression factor. Referring to the example row of pixels 500 in FIG. 5A, (i.e., Row 0 in FIG. 4A with pixels' row index omitted), the current pixel 420 is denoted as $p_0$ and shown as the hollow circle with a cross inside in FIG. 5A. Pixel $p_0$ is the center pixel in the luminance transition range of a slant edge. The other pixels 410 are shown as hollow circles. Pixel $$p_{-\frac{N-1}{2}}$$

is at the left end of the luminance transition range, and pixel $$p_{\frac{N-1}{2}}$$

is at the right end.

As noted, the basic idea for generating a suppression factor is that the enhancement at the center pixel location should be suppressed more than other pixels. As such, away from the center pixel within the luminance transition range, suppression becomes less and less. Outside the luminance transition range, enhancement is not affected by the slant edge detection at the current pixel location.

Figure 5B:
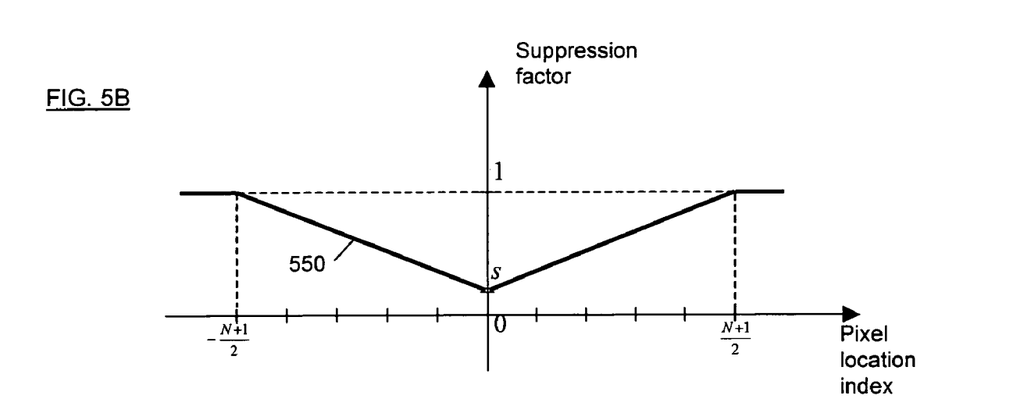
FIG. 5B shows an example function curve used in the system of FIG. 3 to calculate a gain suppression factor for a pixel based on the location of that pixel in the luminance transition range of a slant edge.

Accordingly, an example method of generating a gain suppression factor uses a suppression function such as used by the example curve 550 in FIG. 5B. The curve 550 indicates the gain suppression factor assigned based on the pixel location inside the luminance transition range N as shown in FIG. 5A. A value $s$, $(0 \leq s \leq 1)$, is assigned as the gain suppression factor for the center pixel $p_0$, wherein away from the center pixel $p_0$, the gain suppression factor increases in an essentially linear fashion from s up to 1. In a general form, for a pixel $$p_i, \left(-\frac{N-1}{2} \leq i \leq \frac{N-1}{2}\right),$$

in FIG. 5A, a gain suppression factor can be determined as:

$$\alpha_c = |i|*(1-s)*2/(N+1)+s \qquad (3)$$

Here, $\alpha_c$ is a candidate/temporary gain suppression factor for the enhancement at pixel $p_i$. The candidate gain suppression factor $\alpha_c$ may or may not be the final gain suppression factor $\alpha$ for that pixel location. This is because the luminance transition ranges detected at different pixel locations may overlap with one another and, therefore, it is possible for a pixel to reside in an area with overlapped luminance transition ranges of slant edge. As a result, multiple candidate gain suppression factors would be available for the same pixel, in which case the smallest candidate gain suppression factor $\alpha_c$ should be selected as the final gain suppression factor $\alpha$ for that pixel location.

According to relation (3) above, when s is fixed, the value of the gain suppression factor depends on the ratio of $|i|*2/(N+1)$, indicating the relative location of a given pixel $p_i$ within the detected luminance transition range of the slant edge. The center/current pixel $p_0$ has a gain suppression factor of s, and the pixels $$p_{-\frac{N+1}{2}} \text{ and } p_{\frac{N+1}{2}}$$

are just outside the luminance transition range detected at the current pixel $p_0$ location. The enhancement at these two pixel locations is not affected by the slant edge detection at the current pixel $p_0$. For other pixel locations shown in FIG. 5A that are within the luminance transition range, the gain suppression factor calculated from relation (3) is in the range of [s, 1].

In addition to a pixel's location in the luminance transition range, the pixel's local luminance contrast is taken into consideration in determining the corresponding gain suppression factor. Here, the parameter s is related to the luminance contrast of the slant edge where the pixel is located. If the luminance contrast is high across a slant edge, it is more likely that zigzagged edge artifacts will occur when the edge is detail enhanced. Therefore, more suppression should be provided in that case with s taking a smaller value. As such, in the example herein, the luminance contrast is determined within the detected luminance transition range of a slant edge according to the relation:

$$d = \left| I_{-\frac{N-1}{2}} - I_{\frac{N-1}{2}} \right| \qquad (4)$$

wherein $$I_{-\frac{N-1}{2}} \text{ and } I_{\frac{N-1}{2}}$$

represent the luminance value of pixel $$p_{-\frac{N-1}{2}} \text{ and } p_{\frac{N-1}{2}}$$

respectively in FIG. 5A. The value of d represents the absolute luminance difference between the pixels at the left end and the right end of the luminance transition range (e.g., pixels $$p_{-\frac{N-1}{2}} \text{ and } p_{\frac{N-1}{2}},$$

respectively). If the value of d is large, it means that the luminance contrast within the luminance transition range is high.

Once the value of d is calculated, the parameter s can be determined as:

$$s = 1 - \max(0, \min(1, (d-T_1)/(T_2-T_1)))  \quad (5)$$

wherein $T_1$ and $T_2$ are two predetermined threshold values, $T_2 > T_1 \geq 0$. According to relation (5), when the value of d is smaller than $T_1$, then s would have a value of 1. In this case, no suppression is provided. When the value of d is larger than $T_2$, then s would have a value of 0, which means that the enhancement at the corresponding pixel location is fully suppressed (i.e. no enhancement). When the value of d falls between $T_1$ and $T_2$, then s would have a value between 0 and 1.

Generally, according to relation (5), if the value d is large, then s would have a relatively small value, which means that more suppression is provided to the enhancement of the pixels within the detected luminance transition range. Otherwise, if the value of d is small, it means that the luminance contrast within the luminance transition range is low. In that case, it is less likely for zigzagged edge artifacts to occur in detail enhancement, and as such, less suppression is provided according to relations (3), (4) and (5).

In relation (5), the values of $T_1$ and $T_2$ need to be adjusted when the enhancement gain value K is changed. As shown in FIG. 3, K is used to control the overall intensity of detail enhancement. When K has a large value, the image is enhanced at a higher degree. In this case, even if the luminance contrast across a slant edge is low, the enhanced edge can have zigzagged edge artifacts if the value of K is large enough. Therefore, to effectively prevent zigzagged edge artifacts in detail enhancement, K must also be taken into consideration. In the example herein, the value of K is used in determining the values of $T_1$ and $T_2$ for relation (5). The relations between K and the threshold values $T_1$ and $T_2$ are:

$$T_1 = C_1/K \quad (6)$$

$$T_2 = C_2/K \quad (7)$$

wherein, $C_1$ and $C_2$ are constants, which can be determined by feeding various test images into the system 300 and checking the enhancement results under different values of K. The criterion is that the enhanced images should not have noticeable zigzagged edge artifacts. Once the values of $C_1$ and $C_2$ are determined in the testing process, they are fixed when the system 300 is used in application.

Based on relations (3) through (7), the gain suppression factor α is related to: (i) the location of a pixel in a luminance transition range of a slant edge, (ii) the luminance contrast in the luminance transition range, and (iii) the value of enhancement gain K.

As noted above, the candidate gain suppression factor $\alpha_c$ in relation (3) may or may not be the final gain suppression factor for that pixel location. This is because the luminance transition ranges detected at different pixel locations may overlap with one another and, therefore, it is possible for a pixel to reside in an area with overlapped luminance transition ranges of slant edge. As a result, multiple candidate gain suppression factors would be available for the same pixel, in which case the smallest $\alpha_c$ should be selected as the final gain suppression factor α for that pixel location.

In order to do so, the SFG 320 (FIG. 3) utilizes a temporary buffer for storing the intermediate suppression factor for each pixel location. Initially, all the data in the temporary buffer can be set to 1. Then, the data may be updated based on newly generated candidate suppression factors. In the buffer, the suppression factor for a given pixel location is denoted as α ($0 \leq \alpha \leq 1$). When a new candidate suppression factor $\alpha_c$ is generated for this pixel location according to relation (3), the original data α can be updated as:

$$\alpha = \min(\alpha, \alpha_c) \quad (8)$$

whereby, the smaller of α and $\alpha_c$ is selected and stored in the temporary buffer as the updated suppression factor for that pixel location. When a suppression factor at a given pixel location is no longer to be updated by the processing at the remaining pixel locations, it is considered as the final suppression factor used for the enhancement at that pixel location.

Figure 6:
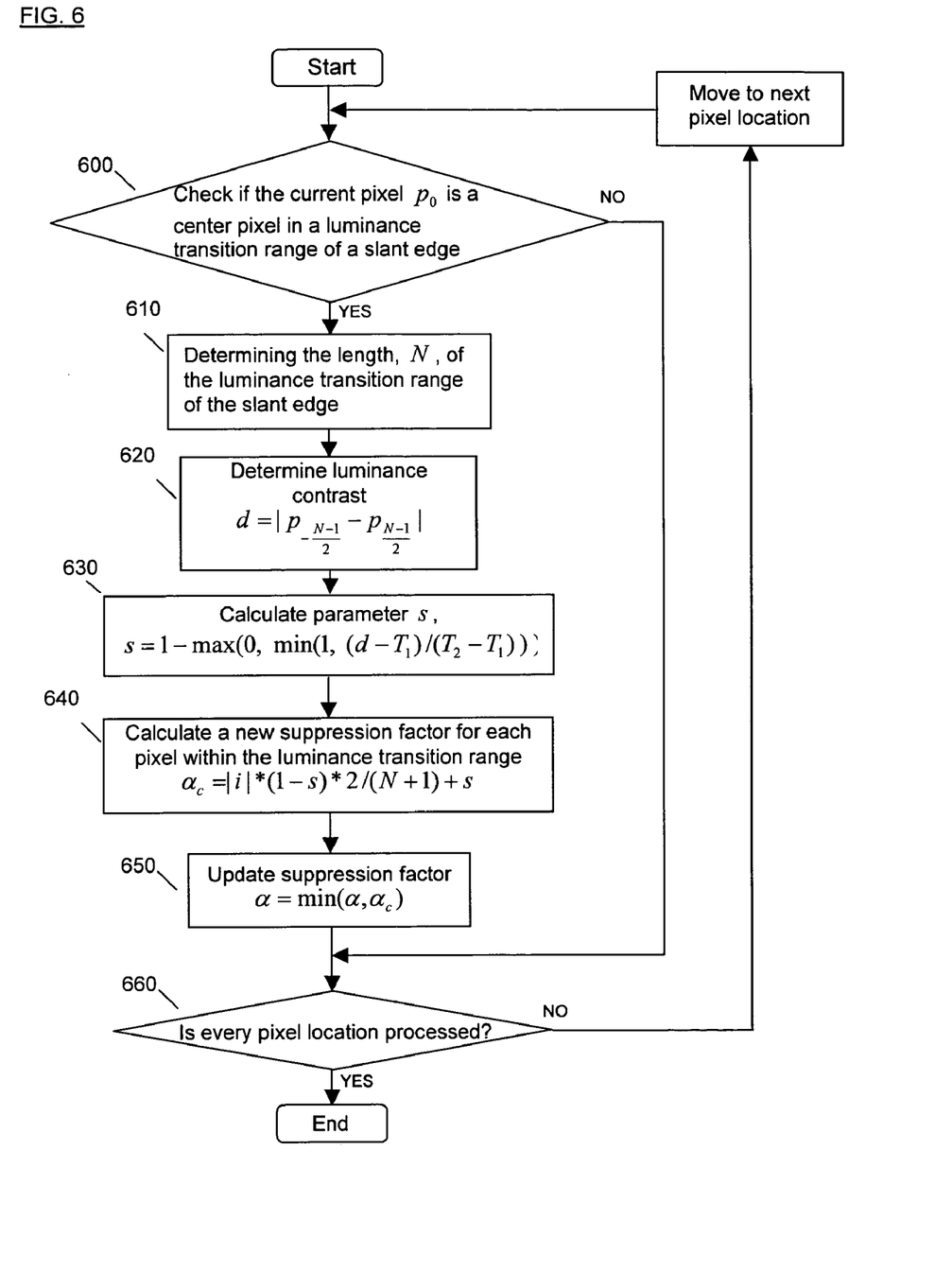
FIG. 6 is a flow chart of an embodiment of steps used in the system of FIG. 3 for obtaining gain suppression factor for each pixel location in the luminance transition range of a slant edge according to the present invention.

FIG. 6 shows an example flowchart of an embodiment of the steps of a process for obtaining a gain suppression factor α for each pixel location according to the present invention. The process includes the step of: Detecting if the center pixel $p_0$ is a center pixel in a luminance transition range of a slant edge (step 600); If it is, then determining the length of the luminance transition range of the slant edge (step 610); Then determining the luminance contrast according to relation (4) above (step 620); Calculating parameter s, according to the relation (5) above (step 630); Calculating a new candidate suppression factor for each pixel within the luminance transition range according to relation (3) above (step 640); and Updating the suppression factor according to relation (8) above (step 650). When there is a next pixel to process, the process moves to that pixel location and repeats the above processing steps (step 660).

Using the above method and system for obtaining gain suppression factors, the detail enhancement around slant image edges can be effectively suppressed so that the slant edge is enhanced appropriately essentially without introduction of zigzagged edge artifacts therein.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned detail enhancement system 300 according to the present invention can be implemented in many ways, such as program instructions for execution by a processor, as logic circuits, as Application Specific Integrated Circuit (ASIC), as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detail enhancement for a digital image signal represented by a set of pixels, comprising the steps of:
   (a) detecting a slanted edge in the image signal, detecting image pixels that belong to a luminance transition range of the slanted edge and determining a center pixel and a length of the luminance transition range, wherein the length of the luminance transition range is along a direction within 45° from the edge direction;
   (b) generating gain suppression factors for the detected image pixels in the luminance transition range of the image edge; and
   (c) performing image detail enhancement on the set of image pixels while selectively reducing enhancement of the detected image pixels in the luminance transition range relative to enhancement of other image pixels based on the gain suppression factors.

2. The method of claim 1, further comprising the steps of:
   selecting enhancement gain factors for the set of image pixels; and
   combining the gain suppression factors with the corresponding enhancement gain factors to obtain adjusted gain factors;
   wherein the length of the luminance transition range is along a row direction or a column direction, and
   wherein the steps of performing image detail enhancement further includes the steps of performing image detail enhancement on the set of image pixels based on the adjusted gain factors to selectively reduce enhancement of the detected image pixels in the luminance transition range of the slanted edge.

3. The method of claim 2, wherein the step of generating a gain suppression factor for a detected pixel further includes the steps of:
   for each pixel within the detected luminance transition range, generating a gain suppression factor based on: (i) the position of the pixel within the luminance transition range relative to the center pixel of the luminance transition range, (ii) the enhancement gain factor for the pixel, and (iii) a luminance contrast across the edge.

4. The method of claim 2, wherein:
   the step of generating the gain suppression factors further includes the steps of selecting the gain suppression factors such that detail enhancement at the center pixel location in the luminance transition range is suppressed more than neighboring pixels in the luminance transition range, wherein for pixel locations farther away from the center pixel location detail enhancement suppression is further reduced.

5. The method of claim 4, wherein the gain suppression factors are selected such that detail enhancement suppression for pixels outside the detected luminance transition range is essentially eliminated.

6. The method of claim 2, wherein the step of generating the gain suppression factors further includes the steps of:
   selecting a candidate gain suppression factor $\alpha_c$ for each pixel location within the detected luminance transition range as:

$\alpha_c = |i|*(1-s)*2/(N+1)+s$ where:
   N is the length of the luminance transition range,
   i is the index for the location of a pixel $p_i$ in the luminance transition range, $$-\frac{N-1}{2} \leq i \leq \frac{N-1}{2},$$

such that the index of the current pixel location is 0, and
   s is a variable related to both the local luminance contrast and the pixel's enhancement gain factor $0 \leq s \leq 1$.

7. The method of claim 6, wherein:

$s=1-\max(0, \min(1, (d-T_1)/(T_2-T_1)))$ where:
   $T_1$ and $T_2$ are predetermined threshold values, $T_2 > T_1 \geq 0$, and
   d is the luminance contrast within the detected luminance transition range, defined as:

$$d = \left| p_{-\frac{N-1}{2}} - p_{\frac{N-1}{2}} \right|.$$

8. The method of claim 7, wherein the threshold values $T_1$ and $T_2$ are related to an enhancement gain factor, K, as:

$T_1 = C_1/K,$ $T_2 = C_2/K,$ where $C_1$ and $C_2$ are constants.

9. The method of claim 6, wherein the step of generating the gain suppression factor for a detected pixel further includes the steps of:
   selecting an initial gain suppression factor $\alpha$; and
   upon generating each candidate suppression factor $\alpha_c$ for the pixel location, updating $\alpha$ as:

$\alpha = \min(\alpha, \alpha_c).$

10. The method of claim 2, wherein the digital image signal is represented by f, and wherein the step of performing detail enhancement for the digital image signal f at a detected pixel further includes the steps of:
    performing a low pass filter function on the image signal f to generate an unsharp image signal $f_1$;
    determining a difference signal between the digital image signal f and the unsharp signal $f_1$, wherein said difference signal represents image details;
    selectively boosting the difference signal such that enhancement of the difference signal at the detected pixel locations is reduced relative to enhancement of other image pixels based on the gain suppression factors; and
    adding the boosted signal to the original digital signal to obtain a detail enhanced image signal g.

11. The method of claim 10, wherein the enhanced image signal g is related to the digital image signal f as:

$g = (f-f_1)*K*\alpha + f,$ wherein:
    $(f-f_1)$ is the difference signal,
    K is the enhancement gain factor for the detected pixel, and
    $\alpha$ is the gain suppression factor for the detected pixel.

12. The method of claim 1, wherein:
the steps (a) further include the steps of:
defining a two-dimensional window of pixels in the digital image;
determining a mean value for a plurality of pixels around a selected pixel inside said window;
based on the mean value, determining whether the selected pixel is in an edge region in the window,
wherein the step of generating gain suppression factors further includes, for each pixel within the luminance transition range, generating a gain suppression factor based on the position of the pixel within the luminance transition range relative to the center pixel of the luminance transition range;
and wherein the step of performing image detail enhancement on the image pixels includes selectively adjusting enhancement of the detected image pixels relative to enhancement of other image pixels based on the gain suppression factors, such that the length of the luminance transition range is essentially maintained.

13. A detail enhancement system for enhancing an digital image signal represented by a set of pixels, comprising:
(a) a detector that detects a slanted image edge and image pixels that belong to a luminance transition range of the slanted image edge, wherein the luminance transition range is along a direction within 45° from the edge direction;
(b) a generator that generates gain suppression factors for the detected pixels; and
(c) a detail enhancer that performs image detail enhancement on the image pixels while selectively reducing enhancement of the detected image pixels relative to enhancement of other image pixels based on the gain suppression factors.

14. The system of claim 13, wherein the luminance transition range is along a row direction or a column direction, and wherein the detail enhancer combines the gain suppression factors with selected enhancement gain factor to obtain adjusted gain factors, and performs image detail enhancement on the set of image pixels based on the adjusted gain factors to selectively reduce enhancement of the detected image pixels.

15. The system of claim 14, wherein the detector further detects a center pixel of the luminance transition range.

16. The system of claim 15, wherein the generator further generates a gain suppression factor for a pixel within the detected luminance transition range based on: (i) the position of the pixel within the luminance transition range relative to the center pixel of the luminance transition range, (ii) the enhancement gain factor for the pixel, and (iii) a luminance contrast across the slanted edge.

17. The system of claim 15, wherein the generator further selects the gain suppression factors such that detail enhancement at the center pixel location in the luminance transition range is suppressed more than neighboring pixels in the luminance transition range, wherein for pixel locations farther away from the center pixel location, detail enhancement suppression is further reduced.

18. The system of claim 17, wherein the gain suppression factors are selected such that detail enhancement suppression for pixels outside the detected luminance transition range is essentially eliminated.

19. The system of claim 15, wherein the generator further generates the gain suppression factors by selecting a candidate gain suppression factor $\alpha_c$ for each pixel location within the detected luminance transition range as:

$$\alpha_c = |i|*(1-s)*2/(N+1)+s$$

where:
N is the length of the luminance transition range,
i is the index for the location of a pixel $p_i$ in the luminance transition range, $$-\frac{N-1}{2} \le i \le \frac{N-1}{2},$$

such that the index of the current pixel location is 0, and
s is a variable related to both the local luminance contrast and the pixel's enhancement gain factor, and $0 \le s \le 1$.

20. The system of claim 19, wherein:

$$s = 1 - \max(0, \min(1, (d-T_1)/(T_2-T_1)))$$

where:
$T_1$ and $T_2$ are predetermined threshold values, $T_2 > T_1 \ge 0$, and
d is the luminance contrast within the detected luminance transition range, defined as:

$$d = \left| p_{-\frac{N-1}{2}} - p_{\frac{N-1}{2}} \right|.$$

21. The system of claim 20, wherein the threshold values $T_1$ and $T_2$ are related to an enhancement gain factor, K, as:

$$T_1 = C_1/K,$$

$$T_2 = C_2/K,$$

where $C_1$ and $C_2$ are constants.

22. The system of claim 19, wherein the generator further generates the gain suppression factor for a detected pixel by selecting an initial gain suppression factor $\alpha$, and upon generating each candidate suppression factor $\alpha_c$ for the pixel location, updating $\alpha$ as $\alpha = \min(\alpha, \alpha_c)$.

23. The system of claim 14, wherein the detail enhancer further performs detail enhancement for the digital image signal at a detected pixel, the detail enhancer comprising:
a filter that performs a low pass filter function on the image signal to generate an unsharp image signal $f_1$;
a difference node that determines the difference between the digital image signal and the unsharp signal $f_1$, as a difference signal, wherein said difference represents image details;
a combiner that selectively boosts the difference signal based on the gain suppression factors such that enhancement of the difference signal at the detected pixel locations is reduced relative to enhancement of other image pixels; and
a summing node that combines the boosted signal to the digital image signal to obtain a detail enhanced image signal g.

24. The system of claim 23, wherein the enhanced image signal g is related to the digital image signal as:

$$g = (f-f_1)*K*\alpha + f$$

wherein:
f is the digital image signal, (f−f$_1$) is the difference signal,
K is the enhancement gain factor for the pixel, and
α is the gain suppression factor for the pixel.

25. The system of claim 13, wherein to detect image pixels that belong to an image edge, the detector further defines a two-dimensional window of pixels in the digital image, and determines a mean value for a plurality of pixels around a selected pixel inside said window, based on the mean value, determines whether the selected pixel is in a an edge region in the window, and if the selected pixel is in an edge region, then the detector determines whether the selected pixel is essentially a center pixel in a luminance transition range of a slant edge, and if the selected pixel is essentially a center pixel in a luminance transition range of a slant edge, then the detector determines the length of the luminance transition range of the slant edge.

26. The system of claim 25, wherein:

the generator is further configured to generate again suppression factor for each pixel within the luminance transition range based on the position of the pixel within the luminance transition range relative to the center pixel of the luminance transition range; and the detail enhancer is further configured to perform image detail enhancement on the image pixels by selectively adjusting enhancement of the detected image pixels relative to enhancement of other image pixels based on the gain suppression factors, such that the length of the luminance transition range is essentially maintained.

\* \* \* \* \*